No. 876,342.  
PATENTED JAN. 14, 1908.
S. D. FRY.
GATE.
APPLICATION FILED MAY 31, 1907.
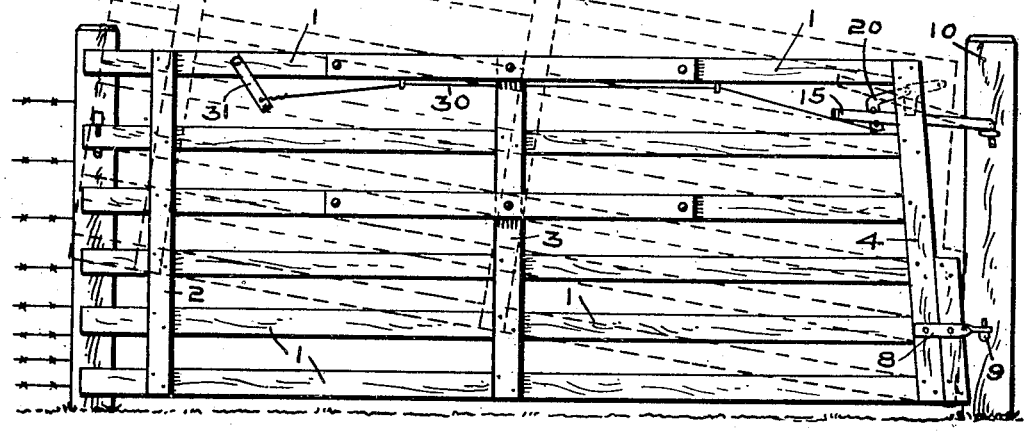
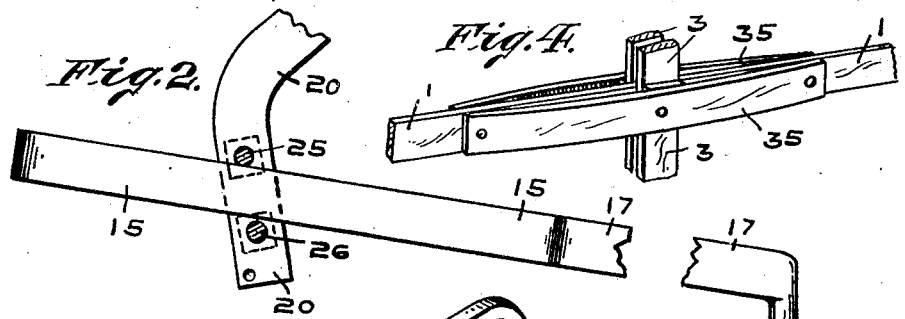
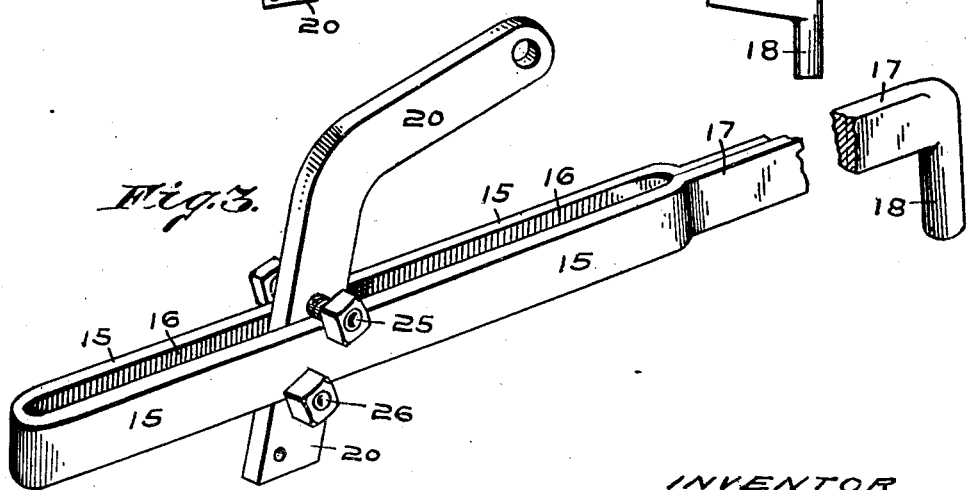
WITNESSES:
INVENTOR  
Stephen D. Fry,  
By  
ATTYS.

UNITED STATES PATENT OFFICE.

STEPHEN D. FRY, OF INDIANAPOLIS, INDIANA.

GATE.

No. 876,342.  Specification of Letters Patent.  Patented Jan. 14, 1908.

Application filed May 31, 1907. Serial No. 376,621.

*To all whom it may concern:*

Be it known that I, STEPHEN D. FRY, a citizen of the United States, residing at Indianapolis, in the county of Marion and State of Indiana, have invented certain new and useful Improvements in Gates, of which the following is a specification.

This invention relates to gates, particularly to that class used on farms and known as farm gates; and the object of the invention is to provide gates of the above character with hinge means so that they may be easily and minutely adjusted in a vertical direction to keep the gate from dragging upon the ground, and during the winter to enable it to swing clear of snow and ice.

A further object consists in providing gates of the above character with hinge means so that the free end of the gate may be easily adjusted in a vertical direction and so held to permit small stock, such as hogs, sheep etc., to pass underneath, while the gate will still act as a barrier for the large stock.

A further object consists in providing farm gates of the above character with hinge means whereby the gate may be easily raised or lowered from its free end.

I accomplish the objects of my invention by the mechanism illustrated in the accompanying drawings, in which Figure 1 is a side elevation of a farm gate embodying my invention, said figure showing in dotted lines the gate elevated at its free end. Fig. 2 is a side elevation of the hinge, on a considerably larger scale, which permits and holds the gate in elevated position. Fig. 3 is a perspective view of the hinge which permits the gate to be elevated, the same being on a still further enlarged scale. Fig. 4 is a perspective view in detail of central portion of the gate showing the truss formation for bracing the gate against lateral strain.

In the drawings, 1 designates a plurality of horizontally extending parallel bars which form the body of the gate. These bars are properly spaced and are secured by means of the vertically extending members 2, 3 and 4. The member 4 is mounted on an angle so that its upper end will be nearer the free end of the gate than its base, and the intervening space between the upper portion of the gate frame and the gate post will permit the gate to move backward when its front or free end is elevated. A hinge formed of a piece of strap iron 8, provided with an eye to engage the pin 9 on the gate post 10, is secured to the lower and rear portion of the gate.

The upper hinge by which the gate is adjusted vertically embodies the essential features of my invention and consists of a hinge bar 15 formed by bending a piece of strap iron so that the forward portion of the two arms will be sufficiently separated to provide a long narrow slot 16; and the rear ends of the arms of said hinge bar are brought together to form a shank 17, which terminates in a hook 18 to engage the eye-bolt 19 on the gate post 10. Pivotally secured to the frame of the gate and immediately above and in perpendicular line with the slot 16 is the curved latch-piece 20, the free end of which passes through said slot 16 in the hinge bar 15. Immediately above and below the edges of the hinge bar 15 I pass the bolts 25 and 26 transversely through the latch-piece 20, so that with the vertical movement of the gate body the bolt 25 will ride on the upper edge of the hinge bar 15, while the bolt 26 will barely be free from the lower edge thereof.

The weight of the gate will cause a binding between the bolts 25 and 26 and the bar 15. The gripping of the parts will retain the gate in any position into which it is moved. When the free end of the gate is elevated the latch-piece 20 will move backward on the hinge bar 15 thus shortening the distance between the fulcrum and the eye-bolt 19 from which the bar swings and cause the gate to retain its position when the hands are removed therefrom. When it is desired to raise and lower the free end of the gate the latch-piece 20 must first be raised to destroy the binding effect between the bolts 25 and 26 and the hinge bar 15, and as the bolt 26 is slightly removed from the lower edge of the bar (see Fig. 3) the latch-piece 20 may be slightly elevated. In order that the operator may remain at the free end of the gate and still be able to operate the latch-piece 20 I attach thereto a wire 30 which runs to the forward portion of the gate and attaches to the lever 31 which is pivotally connected to the gate within easy reach of the operator.

I provide both sides of the central portion of the gate with the additional braces 35 which are bent over the middle upright members 3 and are secured to the horizontally extending bars 1. These braces act as a truss for holding the gate frame in alinement against lateral stress applied thereto.

Having thus fully described my said invention, what I desire to secure by Letters Patent, is—

1. A gate comprising a plurality of longitudinal bars secured at their ends by means of vertical members, hinges for mounting said gate, one of said hinges comprising a hinge-bar provided with a looped end, a latch-piece pivotally secured to the gate-frame and adapted to engage the looped end of the hinge-bar, and means passing transversely through the latch-piece and across the hinge-bar and adapted to bear on said hinge-bar.

2. A gate comprising a plurality of longitudinal bars secured at their ends by means of vertical members, hinges for mounting said gate, one of said hinges comprising a hinge-bar provided with a looped end, a latch-piece pivotally secured to the gate-frame and adapted to engage the looped end of the hinge-bar, means passing transversely through the latch-piece and across the hinge-bar and adapted to bear on said hinge-bar, and means extending to the free end of the gate for operating the latch-piece.

3. In a gate adapted to vertical adjustment at its free end, a hinge consisting of a hinge-bar provided at its free end with a longitudinal slot, a latch-piece pivotally secured to the gate-frame and adapted to engage the slotted end of the hinge-bar, and means on said latch-piece to automatically grip the hinge-bar when the free end of the gate is elevated.

4. In a gate adapted to vertical adjustment at its free end, a hinge consisting of a hinge-bar provided at its free end with a longitudinal slot, a latch-piece pivotally secured to the gate-frame and adapted to engage the slotted end of the hinge-bar, means on said latch-piece to automatically grip the hinge-bar when the free end of the gate is elevated, and means extending from the free end of the gate to and engaging the latch-piece so that the latter may be freed from the hinge-rod.

5. A gate comprising a plurality of longitudinal bars secured at their ends by means of vertical members, braces secured to both sides of the central portion of the gate-frame to form a truss therefor, hinges for mounting said gate-frame, one of said hinges comprising a hinge-bar provided with a looped end, a latch-piece pivotally secured to the gate-frame and adapted to engage the looped end of the hinge-bar, and means on said latch-piece to automatically grip the hinge-bar when the free end of the gate is elevated.

In witness whereof, I have hereunto set my hand and seal at Indianapolis, Indiana, this 22nd day of May, A. D. one thousand nine hundred and seven.

STEPHEN D. FRY. [L. S.]

Witnesses:
F. W. WOERNER,
E. E. MILLER.